(12) United States Patent
Yoon et al.

(10) Patent No.: US 6,299,822 B1
(45) Date of Patent: *Oct. 9, 2001

(54) METHOD OF FABRICATING SILICA GLASS BY SOL-GEL PROCESS

(75) Inventors: Young-Sik Yoon; Young-Min Baik, both of Gumi (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/249,482

(22) Filed: Feb. 12, 1999

(30) Foreign Application Priority Data

Feb. 16, 1998 (KR) .................................................. 98-4604

(51) Int. Cl.[7] .................................................. C04B 35/624
(52) U.S. Cl. .................. 264/621; 264/645; 264/328.2; 264/102; 65/17.2
(58) Field of Search .............................. 65/17.2; 264/645, 264/328.2, 621, 102

(56) References Cited

U.S. PATENT DOCUMENTS

| | | | |
|---|---|---|---|
| 3,222,435 | * 12/1965 | Mellen, Jr. et al. | 264/328.2 |
| 4,574,063 | 3/1986 | Scherer . | |
| 4,624,692 | 11/1986 | Roba . | |
| 5,047,182 | * 9/1991 | Sundback | 264/328.2 |
| 5,169,421 | 12/1992 | Yagi et al. . | |
| 5,240,488 | 8/1993 | Chandross et al. . | |
| 5,578,101 | 11/1996 | Blonder et al. . | |

\* cited by examiner

*Primary Examiner*—James Derrington
(74) *Attorney, Agent, or Firm*—Robert E. Bushnell, Esq.

(57) ABSTRACT

A method of a fabricating silica glass by sol-gel process is provided. The method includes mixing silica, a binder, a dispersing agent and a gelling agent, and forming a sol without air bubbles; injecting the sol into a mold, the injection of the sol into the mold being controlled by the pressure of an inert gas; gelating the sol injected into the mold and demolding the gel; and drying the demolded gel, and thermally-treating the dried gel. Therefore, incorporation of impurities and air bubbles during injection of a sol into a mold is minimized, and injection amount and injection rate of the sol can be controlled.

16 Claims, 2 Drawing Sheets

METHOD OF FABRICATING SILICA GLASS BY SOL-GEL PROCESS

CLAIM OF PRIORITY

This application makes reference to, incorporates the same herein, and claims all benefits accruing under 35 U.S.C. §119 from an application for METHOD OF FABRICATING SILICA GLASS BY SOL-GEL PROCESS earlier filed in the Korean Industrial Property Office on Feb. 16, 1998 and there duly assigned Serial No. 4604/1998.

BACKGROUND OF THE INVENTION

1. Field of the Invention

The present invention relates to a method of fabricating silica glass by a sol-gel process, and more particularly, to a method of injecting sol into a mold during fabrication of silica glass by a sol-gel process.

2. Description of the Related Art

In general, silica glass is transparent and chemically inert, and has a high level of thermal stability and strength, and a low thermal expansion coefficient. Because of such characteristics, silica glass has been useful for optical devices such as an optical fibers or optical lenses.

Basically, an optical fiber is comprised of a core surrounded by a cladding having a refractive index different from the core such that light is totally reflected from the core. In order to fabricate optical fibers, an optical fiber preform including a core rod and an overcladding tube enclosing the core rod is prepared. Then, the optical fiber preform is thermally-treated and then extended to form the optical fibers.

Hereinafter, a method of manufacturing an overcladding tube formed of silica glass by the sol-gel process will be briefly described. First, silica particles are dispersed in water. Fumed silica is used for the silica particles. The fumed silica is a pyrogenic silica obtained by thermally decomposing a silicon compound, e.g., silicon tetrachloride ($SiCl_4$). Then, a dispersing agent, a binder and a plasticizer are added to the mixture, and mixed well to form a sol.

The obtained sol is aged for a predetermined period of time. After removing air bubbles from the aged sol, a gelling agent is added and the sol is immediately poured into a mold for gelation. After gelation is completed, the gel is separated from the mold and then dried.

Then, the dried gel is thermally-treated to remove organic substances from the gel. Then, dehydroxylation and sintering processes are performed, thereby completing an overcladding tube formed of silica glass.

Injection of the sol into the mold is achieved by pouring the sol from the top to the bottom of the mold, by a method using the height difference between the sol and a mold having a bar and a tube, and a sol container, or by a method using a pump.

In the method of pouring the sol from the top to the bottom of the mold, air bubbles are formed during dropping of the sol and these bubbles remain in a gel formed from the sol.

The method using the height difference between the sol and the mold, basically requires a smooth up-and-down movement of the sol container, so that the design of such a sol injecting device is correspondingly complicated. Also, it is difficult to mold the sol within a short time and to control the sol injecting rate to an intended level.

In addition, the method using a pump causes contamination of the sol by impurity during injection of a sol when the sol is injected rapidly. Thus, it is difficult to obtain a high-purity silica glass.

Examples of the silica sol-gel molding from the conventional art are seen, for example, in the following U.S. Patents. U.S. Pat. No. 4,574,063, to Scherer, entitled Method Of Forming Glass Or Ceramic Article, describes a method for casting a silica sol-gel in a mold. In one example given, the suspension is transferred by gravity from a separatory funnel through a ⅛" Teflon(R) plastic tube, prior to addition of the gelling agent. In another example, the suspension is drawn from a separatory funnel through a plastic tube to a glass delivery cylinder by means of a motor-driven plastic piston in the cylinder, and then is forced by the piston into the mold through a flexible plastic tube and a stainless steel delivery tube. These transfer methods are similar to the height difference and pump methods described above.

U.S. Pat. No. 5,169,421, to Yagi et al., entitled Method Of Manufacturing Silica Glass Optical Wavelength Preform, describes an extruding apparatus for making a silica glass preform from a plastic silica suspension. This method does not involve sol-gels, and the silica gel suspension used is much more viscous than an ungelled sol. The apparatus is essentially a mechanical pump.

U.S. Pat. No. 5,240,488, to Chandross et al., entitled Manufacture Of Vitreous Silica Product Via A Sol-Gel Process Using A Polymer Additive, describes a sol-gel process involving a particular additive to the sol. In the examples given, the sol is generally described as poured, cast or transferred to a mold. In some cases, the free space in the mold was evacuated to rid the sol of trapped air after the sol was poured.

U.S. Pat. No. 5,578,101, to Blonder et al., entitled Method of Making a Sol-Gel Glass Body And Removing Same From Mold, describes an electrochemical process for releasing a sol-gel from a mold. In the examples given, the sol-gel is poured into the mold.

Based on our observation of the art, then, I have decided that what is needed is an improved method for transferring a silica sol to a mold, allowing rapid, controlled transfer without formation of air bubbles or contamination of the sol.

SUMMARY OF THE INVENTION

It is therefore an object of the present invention to provide an improved method of fabricating silica glass by the sol-gel process.

It is a further object of the present invention to provide a method of sol-gel fabrication in which generation of air bubbles in the gelling sol is minimized.

It is a still further object of the present invention to provide a method of sol-gel fabrication in which introduction of impurities is minimized.

It is a yet further object of the present invention to provide a method of sol-gel fabrication which allows for rapid filling of the mold.

It is still yet a further object of the present invention to provide a method of sol-gel fabrication which allows for easily controlled filling of the mold.

To achieve the objectives of the present invention, there is provided a method of fabricating silica glass by sol-gel process, including the steps of mixing silica, a binder, a dispersing agent and a gelling agent, and forming a sol without air bubbles; injecting the sol into a mold, the injection of the sol into the mold being controlled by the pressure of a gas; gelating the sol injected into the mold and demolding the gel; and drying the demolded gel, and thermally-treating the dried gel.

The gas is preferably a purified gas or an inert gas. As the inert gas, argon or nitrogen may be used. Preferably, the pressure of the inert gas is in the range of between approximately 0.01 and 2.5 $kg/cm^2$.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
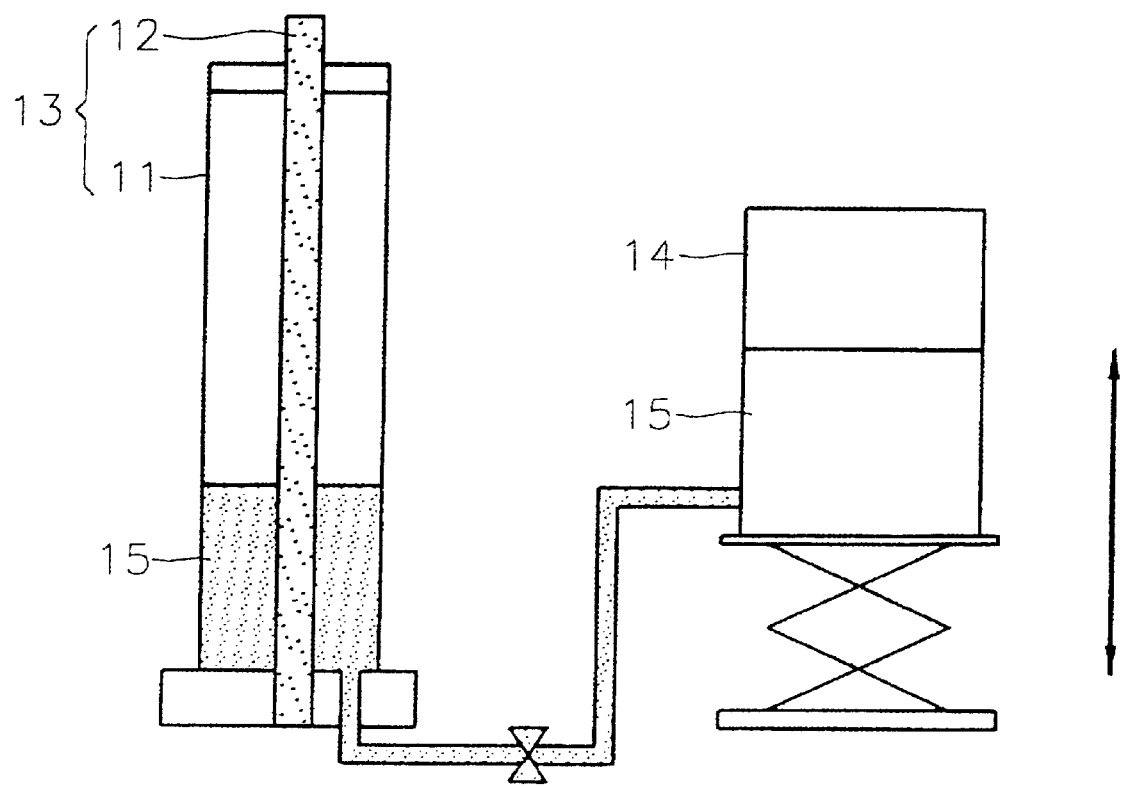
FIG. 1 is a view illustrating a conventional method for injecting a sol into a mold.

The conventional method of injection of the sol into the mold by using the height difference between the sol and a mold, as described above, is shown in FIG. 1. The method uses mold 13 having bar 12 and tube 11, and sol container 14. The method, using the height difference between sol 15 and mold 13, basically requires a smooth up-and-down movement of sol container 14, so that the design of such a sol-injecting device is correspondingly complicated.

In a method for fabricating silica glass according to the present invention, when injecting a sol into a mold, the injection amount and the injection rate of the sol are freely controlled using the pressure of a gas. Hereinafter, a method for fabricating silica glass according to the present invention will be described.

First, silica, a dispersing agent, a binder and a solvent are mixed to form a sol. The obtained sol is aged for a predetermined period of time to stabilize silica particles within the sol. A gelling agent is added to the stabilized sol. Preferably, the pH of the sol is 9~11. If the pH of the sol is out of the range, the pH of the sol is adjusted using an acidic or basic solution. Then, air bubbles contained in the sol are removed using a vacuum pump.

The sol from which the air bubbles have been removed is injected into a mold having a tube and a bar. The injection of sol into the mold will be described with reference to FIG. 2.

Figure 2:
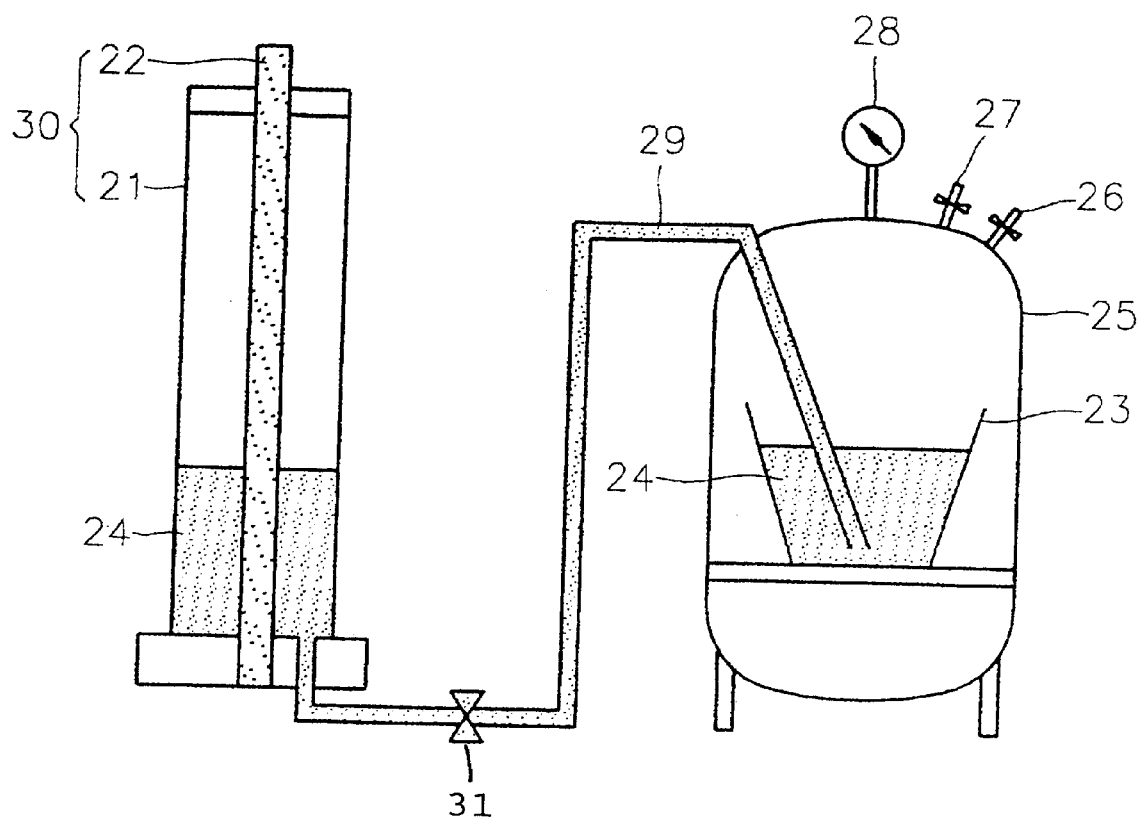
FIG. 2 is a view illustrating a method for injecting a sol into a mold according to a preferred embodiment of the present invention.

As shown in FIG. 2, sol container 23 in which sol 24 is contained is placed in sol injecting device 25. Here, sol injecting device 25 has rounded edges and is formed of stainless steel. Sol injecting device 25 should be capable of enduring a pressure of 10 $kg/cm^2$ and have a structure capable of withstanding vacuum conditions, for removing air bubbles from the sol.

Gas injection portion 26 shown in FIG. 2 is an inlet via which a high-purity gas such as argon (Ar) and nitrogen ($N_2$) is injected into sol injecting device 25, and pressure control valve 27 controls the pressure of the gas injected into sol injection device 25 to control the injection rate of the sol. Alternatively, the pressure can be controlled by use of a regulator on the gas supply. Also, vacuum gauge 28 indicates the pressure in sol injecting device 25, and sol transfer path 29 is a path through which the sol is transferred from sol container 23 to mold 30.

Preferably, sol transfer path 29 is formed of a polymer such as Teflon®, polyurethane, polystyrene, polyethylene or polypropylene. Sol transfer path 29 formed of such a polymer is easily cleaned, so that management thereof is easy. Also, the possibility of inflow of impurities caused by wearing of the path into the sol, or generation of air bubbles during the sol injection is minimized.

The above-described sol injecting device has a simple structure compared to a conventional sol injecting device. That is, whenever the pressure of the sol injecting device is a predetermined value, e.g., in the range of between approximately 0.01 and 2.5 $kg/cm^2$, the sol can be injected into the mold. Thus, an auxiliary device for moving up and down the sol container, which is required to inject the sol using the sol height difference between the sol container and the mold, is not necessary. Also, if elimination of air bubbles is required, the air bubbles can be removed from the sol in the above-described sol injecting device by reducing the pressure with a vacuum pump, prior to injecting into the mold. Thus, an air bubble removal step may be carried out before and/or after the prepared sol is placed in the injecting device.

Before injecting the sol into mold 30 using such a sol injecting device, the gas is injected into sol injecting device 25 via gas injection portion 26. Then, the pressure of the gas injected into sol injecting device 25 is adjusted within a predetermined range, such that sol 24 of sol container 23 is injected into mold 30 having tube 21 and bar 22 via sol transfer path 29, and the transferring of the sol 24 to mold 30 can also be controlled by means of a valve 31 in the transfer path 29.

After injecting the sol from which the air bubbles have been removed into the mold, the sol in the mold is gelated. After gelation, bar 22 is removed from mold 30, and the gel is then dried.

The dried gel is thermally treated at 300~600° C. at a rate of 10~100° C. per hour to remove organic substances from the gel. Then, the gel is heated to 500~1,000° C. at a rate of 100° C. per hour for a predetermined time for glassification. Here, the glassification is performed under a chlorine gas atmosphere to remove hydroxy groups. Then, the resultant is heated to 1,100–1,400° C. at a rate of 100° C./hour under a helium gas atmosphere for approximately 5 hours.

Hereinafter, a method for fabricating silica glass according to the present invention will be described through the following example. However, the present invention is not limited to the following example.

5,600 g of fumed silica and 14,000 g of deionized water were mixed in a ball mill for 24 hours, and the mixture was dried in an oven set to 120° C. for 24 hours. The died mixture was sieved by a sieve (#20 mesh), and then heated in a furnace set to 800° C. for 3 hours, resulting in thermally treated silica powder.

5,600 g of the thermally treated silica powder, 1,400 g of the fumed silica, 5,600 g of deionized water, 700 g of 25 wt % tetramethylammonium hydroxide solution, 21 g of polyethyloxazoline and 63 g of glycerine were mixed using a homogenizer at a rate of 6,000 rpm for 2 minutes. The mixture and 20 kg of glass ball were mixed in the ball mill for 6 hours, and then aging treated at room temperature for 18 hours.

238 g of ethyl lactate was added to the aging treated sol and mixed for 5 minutes. Then, air bubbles were removed from the mixture using a vacuum pump.

The sol from which the air bubbles had been removed was put into the sol container placed in the sol injecting device shown in FIG. 2, and an inert gas having a pressure of 0.5 $kg/cm^2$ was applied to the device such that the sol was injected into the mold.

The sol injected into the mold was gelated. After gelation for 50 minutes, the gel was aged for 2 hours. Then, the bar was removed from the mold, and then the gel was dried in an incubator set to 35° C. and a relative humidity (RH) of 65% for approximately 60 hours.

The dried gel was heated to 120° C. at a rate of 10° C. per hour, and then dried at the same temperature for 24 hours to remove the water remaining in the gel. Then, the resultant was heated to 600° C. at a rate of 50° C. per hour, and then thermally treated at the same temperature to remove organic substances from the dried gel.

The gel from which the organic substances had been removed was heated to 1,000° C. at a rate of 100° C. per hour and maintained at the same temperature for 5 hours for glassification. Here, the glassification was performed under a chlorine gas atmosphere to remove hydroxy groups.

Lastly, the resultant was heated to 1,450° C. at a rate of 100° C./hour under a helium gas atmosphere, and the gel was sintered at that temperature for 1 hour, thereby forming silica glass tube having 22 mm inner diameter, 67 mm outer diameter and 1000 mm length.

The shrinkage ratio of the silica glass tube fabricated by the above-described method was measured. The result was that the silica glass had a shrinkage ratio of approximately 24%, which is lower than that for silica glass fabricated by a conventional method, and had excellent purity.

As described above, in the method for fabricating silica glass according to the present invention, incorporation of impurities and air bubbles during injection of a sol into a mold is minimized, and injection amount and injection rate of the sol can be controlled. Thus, a highly viscous sol can be injected into the mold within a short time. The sol injection time can be reduced compared to the conventional case, thereby improving productivity.

What is claimed is:

1. A method of fabricating silica glass by a sol-gel process, comprising the steps of:

preparing a silica sol including a gelling agent;

providing the silica sol including the gelling agent in a chamber;

reducing pressure in the chamber to remove air bubbles from the silica sol including the gelling agent;

injecting the silica sol including the gelling agent from the chamber into a mold by applying a pressure of a gas in the chamber; and allowing the silica sol including the gelling agent to gel in the mold to provide a gelled silica sol.

2. The method of claim 1, further comprised of the gas being one of a purified air and an inert gas.

3. The method of claim 2, further comprising:

the inert gas being argon.

4. The method of claim 2, further comprising:

the inert gas being nitrogen.

5. The method of claim 2, further comprising:

the pressure of the inert gas in the step of injecting the silica sol including the gelling agent being in the range of from 0.01 to 2.5 $kg/cm^2$.

6. The method of claim 1, further comprised of said step of preparing the silica sol including the gelling agent further comprising the step of mixing silica, a binder, a dispersing agent, the gelling agent and a solvent to provide a mixed silica sol including the gelling agent.

7. The method of claim 6, further comprised of said step of preparing the silica sol including the gelling agent further comprising the step of exposing the mixed silica sol including the gelling agent to reduced pressure in the chamber to remove air bubbles.

8. The method of claim 1, further comprising the steps of:

removing the gelled silica sol from the mold; and heat-treating the gelled silica sol to remove impurities and to sinter the gelled silica sol.

9. The method of claim 1, further comprised of said step of injecting the silica sol including the gelling agent further comprising the step of:

applying the pressure of the gas in the chamber to transfer the silica sol including the gelling agent from the chamber through a transfer path to the mold.

10. The method of claim 9, further comprised of:

in the step of applying the pressure of the gas, maintaining the pressure of the gas at a predetermined value while the silica sol including the gelling agent is being transferred from the chamber to the mold.

11. The method of claim 10, further comprised of the predetermined value being in a range of from 0.01 to 2.5 $kg/cm^2$.

12. The method of claim 10, further comprised of the pressure of the gas being maintained at the predetermined value by a pressure control valve on the chamber for controlling the pressure of the gas.

13. The method of claim 9, further comprised of transferring of the silica sol including the gelling agent from the chamber to the mold being controlled by means of a valve in the transfer path.

14. The method of claim 9, further comprised of the transfer path being formed of a polymer.

15. The method of claim 14, further comprised of said polymer being selected from the group consisting of polytetrafluoroethylene, polyurethane, polystyrene, polyethylene and polypropylene.

16. The method of claim 9, further comprised of:

after providing the silica sol including the gelling agent in the chamber, then reducing the pressure in the chamber to remove air bubbles from the silica sol including the gelling agent.

* * * * *